Figure 1:
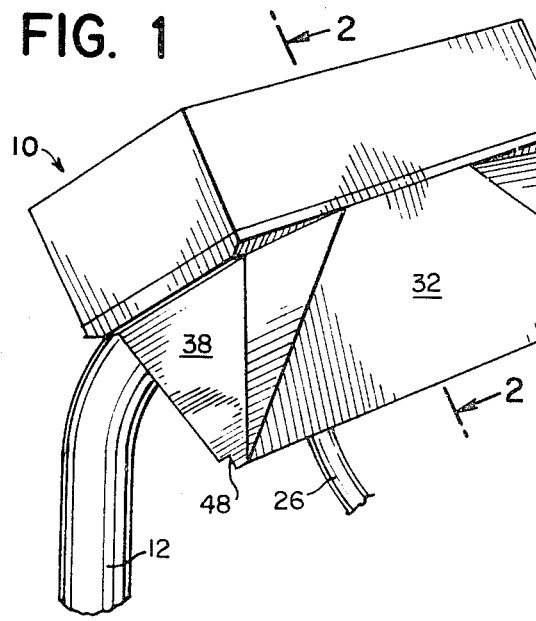

United States Patent

Drapkin

[15] 3,639,886
[45] Feb. 1, 1972

[54] WEATHERPROOF ELECTRICAL OUTLET BOX AND RECEPTACLE

[72] Inventor: William Drapkin, Centereach, N.Y.
[73] Assignee: Slater Electric Inc., Glen Cove, N.Y.
[22] Filed: Nov. 4, 1970
[21] Appl. No.: 86,813

[52] U.S. Cl. ..................................339/36, 174/66, 220/24.2
[51] Int. Cl. ..........................................................H01r 13/44
[58] Field of Search ....................339/36, 39, 59; 174/66, 67; 220/24.2, 24.3

[56] References Cited

UNITED STATES PATENTS

| 2,470,320 | 5/1949 | Page | 174/66 |
| 2,934,591 | 4/1960 | Tukkainen | 174/67 |
| 3,312,770 | 4/1967 | McKenna et al. | 174/66 X |
| 3,508,291 | 4/1970 | Klebe, Jr. | 174/135 X |

Primary Examiner—Marvin A. Champion
Assistant Examiner—Terrell P. Lewis
Attorney—George B. Finnegan, Jr., Granville M. Pine, John D. Foley, Jerome G. Lee, Thomas P. Dowling, John A. Diaz, Warren H. Rotert, John C. Vassil and Alfred P. Ewert

[57] ABSTRACT

A weatherproof outlet box in which an electrical receptacle can be mounted includes a plastic hood secured to the outlet box and enveloping the receptacle. The hood includes top, bottom and side panels, with the side panels diverging outwardly and the top and bottom panels converging. The hood is made of a pliable material so that when pressure is applied to the side panels, the narrow elongated slot in the forward end of the hood is caused to open so that a plug can be inserted into the receptacle.

6 Claims, 4 Drawing Figures

PATENTED FEB 1 1972

3,639,886

*INVENTOR.*
WILLIAM DRAPKIN

BY Darby & Darby

ATTORNEYS

WEATHERPROOF ELECTRICAL OUTLET BOX AND RECEPTACLE

The present invention relates to an outdoor electrical fixture and, more particularly, to a device for protecting an outdoor electrical receptacle or other wiring device from environmental conditions.

The use of outdoor electrical receptacles is common. Such receptacles may be located in the wall of a building or they may be mounted within an outlet box suitably supported at the end of an electrical conduit. With such devices, it is common to use a hinged lid which, when the receptacle is not being used, can be lowered to protect the receptacle sockets from the elements.

Such devices can protect the receptacle from water and snow during periods in which the receptacle is not used. However, they are not always satisfactory, particularly where it is desired to use the wiring device during inclement weather. Although various types of hoods have been used to protect such receptacles during use, these hoods have generally been found lacking in at least some respects. For example, where a metallic hood is provided, a relatively large opening must be provided if convenient access to the receptacle is to be maintained. This, however, increases the possibility of water being deflected into the receptacle itself. If the opening is reduced in size to lessen this possibility, it may be difficult to insert the plug into the receptacle.

The present invention provides a weatherproof electrical fixture which is simple and inexpensive, yet capable of protecting an electrical receptacle from the weather at all times while permitting convenient access to the receptacle.

Briefly, in accordance with the invention, a hood made of a pliable material is secured to an outlet box in which the receptacle is mounted. The hood includes top and bottom panels and two side panels, with the top and bottom panels converging together to form a relatively narrow slot. When pressure is applied to the side panels, this narrow slot is enlarged by the flexing of the top and bottom panels to provide access to the receptacle.

Figure 2:
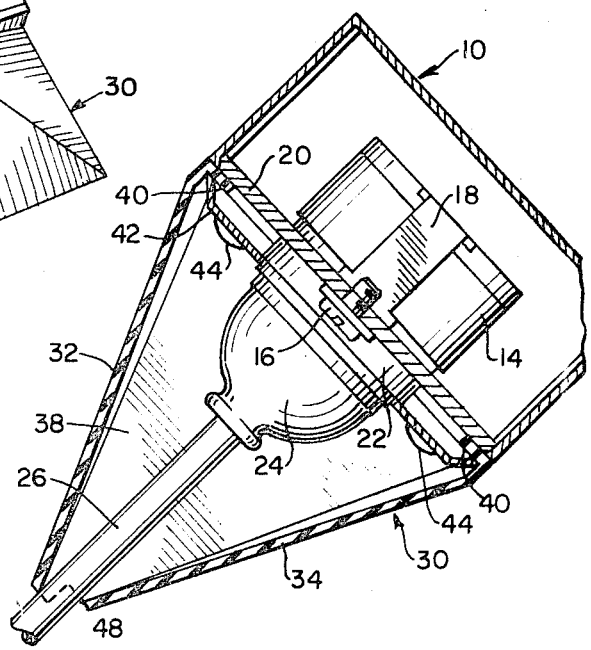
Figure 3:
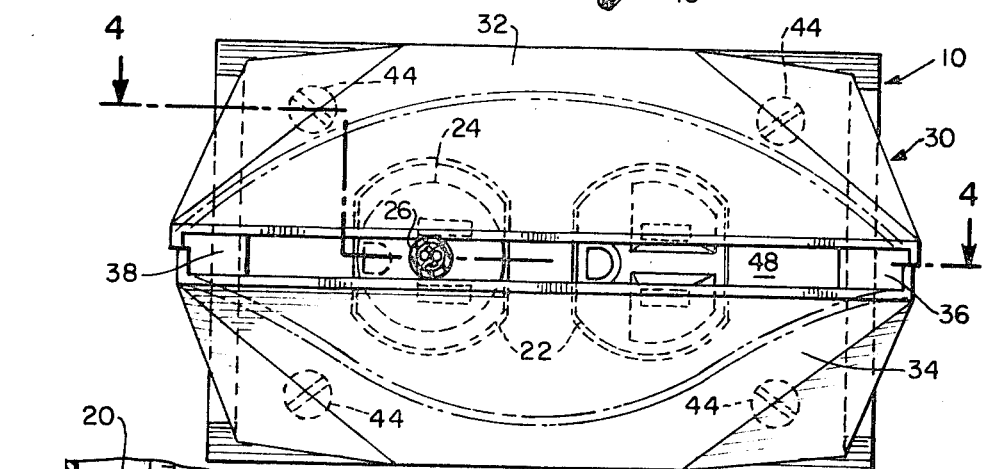
Figure 4:
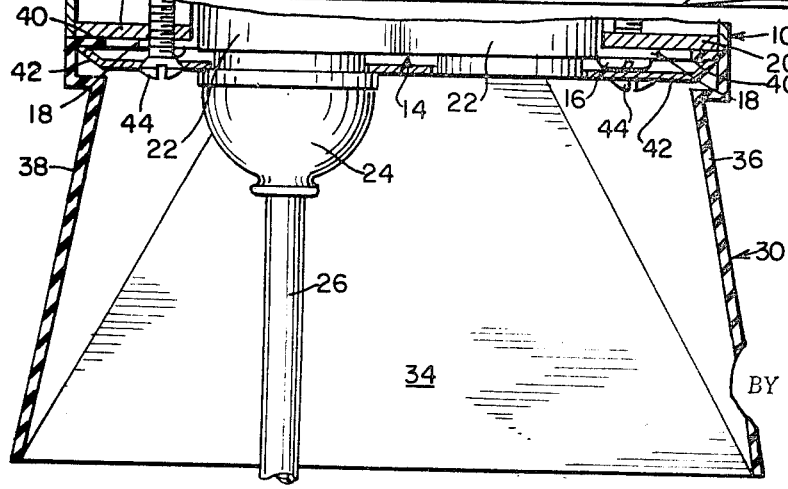

The invention is described in further detail below with reference to the attached drawings wherein:

FIG. 1 is a prospective view of a combined outlet box and hood according to the invention;
FIG. 2 is a side sectional view along the line 2—2 of FIG. 1;
FIG. 3 is a front view of the invention; and
FIG. 4 is a top sectional view along the line 4—4 of FIG. 3.

In the drawings, a standard outlet box is shown at 10 connected to the end of an electrical conduit 12. An electrical receptacle 14 (shown as the duplex type) is secured within outlet box 10 by means of screws 16 passing through a mounting strap 18 into threaded engagement with tapped bores (not numbered) within front rims 20 of outlet box 10.

The two receptacles 22 are disposed so that they are accessible from the open end of the outlet box 10 and each is adapted to receive a standard electrical plug 24 which may be coupled to an appliance or other electrical device by means of wire 26. The construction as so far described is standard.

According to the invention, a hood 30 is secured to the outlet box 10 so as to envelop the entire receptacle 14. Hood 30 is a single unitary member and comprises a top panel 32, a bottom panel 34, a right side panel 36 and a left side panel 38. Top panel 32 and bottom panel 34 converge toward each other in a direction away from the outlet box 10. As illustrated most clearly in FIG. 3, the top and bottom panels 32 and 34 are slightly convex. The side panels 36 and 38 are flat panels and diverge outwardly from the outlet box 10. A rim 40 (FIG. 2) is provided around the entire periphery of the hood adjacent the outlet box 10. Rim 40 is adapted to be retained beneath a cover plate 42 which is secured to the flange 20 by means of four screws 44. A "bead" (not shown) may be integrally formed (or secured) to the panel edges defining slot 48 for decorative purposes and/or, if needed, to serve as a stiffening member.

The top panel 32 extends slightly beyond the bottom panel 34 (see FIG. 2) for protection against rain or other climatic conditions. The forward ends of the panel form a rectangular slot 48 which is relatively narrow and which generally will permit complete protection of the receptacle from the weather. When the user wishes to insert a plug such as 24 into the receptacle, he merely has to press together the side panels 36 and 38 causing the slot 48 to expand as illustrated by phantom lines in FIG. 3. This provides adequate space for insertion of the plug into the receptacle.

The preferred embodiment of the invention, as described in the foregoing, is a particularly advantageous construction. This is because despite the flexibility of the hood, application of pressure to the bottom edges of the side panels 36 and 38 will always cause the slot 48 to expand as illustrated in phantom lines in FIG. 3. Even where the upper edge of the top panel 32 defining the top of slot 48 tends to "sag" because of the flexibility of the material, it has been found that application of pressure to the lower portions of the side panels 36 and 38 will cause the upper panel 32 to bow upwardly while the lower panel collapses downwardly. Consequently, the slot 48 will be extended so that the user can insert a plug into either receptacle.

This effect is assisted in part by the diverging sidewalls 36 and 38 which form junctions with the upper panel 32 that do not tend to collapse when pressure is applied to the side panels. It is also aided by the slight convex curvature of the top and bottom panels 32 and 34.

Many materials are suitable for the hood. In the preferred embodiment, neoprene rubber of a thickness of about three thirty-seconds inch was used. When this type of material is used, the edges which appear as sharp lines in the drawings will actually be more rounded, at least to the extent that the top and bottom panels will appear to be a single-curved surface. The foregoing is presented solely as an example of a preferred embodiment. Obviously, numerous resilient materials and dimensions can be utilized within the scope of the invention as defined in the annexed claims.

What is claimed is:

1. In combination, an outlet box, an electrical receptacle mounted in said outlet box and adapted to receive an electrical plug, the sockets of said receptacle extending from a surface of said outlet, and a hood secured to said outlet box and extending outwardly from said surface, said hood being made of a pliable material and including a top panel, a bottom panel and two side panels enveloping said surface, said top and bottom panels converging together to define a slot therebetween at their extremities furthest removed from said surface, said slot being elongated in the direction of the edges of the said panel extremities, whereby application of pressure to said side panels causes said slot to open so that an electrical plug can be inserted into said receptacle through the opened slot.

2. The combination according to claim 1, wherein said side panels diverge outwardly from said surface.

3. The combination according to claim 2, wherein said top and bottom panels are convex.

4. The combination according to claim 3, further including stiffener members secured to the forward ends of said top and bottom panels.

5. The combination according to claim 3, further including a cover plate covering said surface and wherein each of said panels includes a rim which is secured between said cover plate and said outlet box.

6. The combination according to claim 2, wherein said top panel extends beyond said bottom panel to protect the receptacle from environmental conditions.

* * * * *